United States Patent [19]

Po-Chieh

[11] Patent Number: 5,508,827
[45] Date of Patent: Apr. 16, 1996

[54] COLOR SEPARATION PROCESSING METHOD AND APPARATUS FOR A FOUR COLOR PRINTER USING COLOR SOLID CORRESPONDING TO TRISTIMULUS VALUES

[75] Inventor: Hung Po-Chieh, Hino, Japan

[73] Assignee: Konica Corporation, Tokyo, Japan

[21] Appl. No.: 189,507

[22] Filed: Jan. 31, 1994

[30] Foreign Application Priority Data

Feb. 15, 1993 [JP] Japan ................... 5-025534

[51] Int. Cl.[6] ............... H04N 1/56; H04N 1/60
[52] U.S. Cl. .............. 358/518; 358/520; 358/521; 358/529
[58] Field of Search .................. 358/518, 529, 358/520, 521, 525; 382/167; 395/109

[56] References Cited

U.S. PATENT DOCUMENTS

| | | | |
|---|---|---|---|
| 4,482,917 | 11/1984 | Gaulke et al. | 358/518 |
| 4,551,751 | 11/1985 | Jung | 358/518 |
| 4,590,515 | 5/1986 | Wellendorf | 358/518 |
| 5,172,223 | 12/1992 | Suzuki et al. | 358/529 |
| 5,331,440 | 7/1994 | Kita et al. | 358/529 |

FOREIGN PATENT DOCUMENTS

| | | | |
|---|---|---|---|
| 2-136848 | 2/1990 | Japan . | |
| 56566 | 2/1992 | Japan | H04N 1/46 |
| 369970 | 12/1992 | Japan | H04N 1/46 |
| 6-98161 | 6/1994 | Japan . | |

*Primary Examiner*—Scott A. Rogers
*Attorney, Agent, or Firm*—Frishauf, Holtz, Goodman, Langer & Chick

[57] ABSTRACT

A color separation processing method and circuit for reproducing a color image with four color components of yellow, magenta, cyan, and black. The method comprises the steps of: receiving target color signals representing a portion of the color image; determining an amount of a black color component of the portion of the color image so that the black color component of the portion is gradually changed from other neighbor portions of the color image; and determining amounts of yellow, magenta, and cyan components of the portion of the color image according to the amount of the black color component. The circuit realizes the method above.

9 Claims, 5 Drawing Sheets

A BOUNDARY CONDITION IN A CASE WHERE ALL COLOR REGIONS ARE USED

NO SMOOTHING OPERATION

A ONE-TIME SMOOTHING OPERATION

SMOOTHING OPERATIONS : 5 REPETITIONS

SMOOTHING OPERATIONS : 100 REPETITIONS (A K-AMOUNT IS ALMOST CONVERGED)

A COLOR REGION WHICH CAN NOT BE USED BY THE CONVENTIONAL METHOD

COLOR SEPARATION PROCESSING METHOD AND APPARATUS FOR A FOUR COLOR PRINTER USING COLOR SOLID CORRESPONDING TO TRISTIMULUS VALUES

BACKGROUND OF THE INVENTION

The present invention relates to a method, by which a combination of four colors is determined, and an apparatus for the method, in a four color printer in which a target color is color-reproduced when four colors of Y (Yellow), M (magenta), C (Cyan), and K (Black) are combined, and specifically, to the method and apparatus in which reproducibility is improved when an amount of K is specifically determined.

When full-color printing is conducted by usual methods of printing, thermal transfer, ink jet, or electrophotography, four colors of Y, M, C, and K are generally used as output colors in color printing.

Conventionally, various types of methods, by which the color is expressed colorimetrically in four colors, have been tried.

For example as the first method, the following method has been disclosed: a new K-amount is determined when the K-amount of a color solid, which is formed by conditions of Y=0, M= 0, and C=0, is weighed with a predetermined amount; and new Y, M, C amounts are colorimetrically determined according to the new K-amount (Theses of the 9th Chromatic Engineering Conference, Flexible UCR using L * a * b * the first report, A method of considering new UCR which can be used for both letter and half tone reproduction, written by Shinji Kita and Akira Kokatsu in 1992).

As the second method, the following method has been disclosed in which a combination of Y, M, C, K, by which a target color is reproduced from four color solids determined under the condition of Y=0, M=0, C=0, K= max., is found (refer to Japanese Patent Publication Open to Public Inspection No. 136848/1990). Due to the foregoing, the total amount of ink can be reduced when a maximum K-amount is used while the maximum color region, which can be reproduced in the four color printer, is kept constant.

As the third method, the following method in which a combination of Y, M, C, K is found, by which a target color is reproduced from the four solids determined under the conditions of Y=max., M=max., C=max., K=0, has been disclosed in Japanese Patent Application No. 266718/1992 (published as Japanese Patent Publication Open to Public Inspection No. 6-98161). In this method, the minimum K-amount is used and the total amount of ink is increased. However, the gradation properties are improved because noises are cancelled when the number of colors to be used is increased.

However, in these conventional methods, a portion is generated in which the K-amount is suddenly changed when the target color is changed. Accordingly, the conventional methods have the following common problem in which a pseudo profile is generated when the printing quality fluctuates.

Theoretically, the same target color can be reproduced by combinations of Y, M, C, K even when the K-amount is changed. Practically, because the printing quality fluctuates, errors are caused by the combination in which the K-amount is largely changed. Therefore, even when increasing and decreasing directions of a predetermined color element, for example, brightness, in the target color, (the directions of the change correspond to those of density of a reproduced color), are matched with those of the K-amount, the K-amount is not smoothly changed and the pseudo profile is easily generated, in the boundary portion between a portion in which the K-amount rises or smoothly changes from a region, in which K is not used, to the region, in which K is used, and a portion in which the K-amount is fixed at the maximum.

Further, image signals (R, G, B) of an image, which is displayed in a target device such as a CRT, are converted into image signals (Y, M, C, K) which are reproduced in a printer, which is used as a device for reproduction. In this case, when a function transformation by an LUT (Look Up Table) and an interpolation by an interpolation device are combined, the interpolation is conducted according to data of the color solids located on both sides between which the non-smooth portion is sandwiched. In this case, there occurs the following problem in which interpolation errors become large because one data portion is connected with the other data portion in the shape of a polygonal line, which is not smoothly connected (Japanese Patent Disclosure 53-123201 (1978)).

Further, in the first method, because a K-amount to reproduce the target color is calculated in combinations which are made under the conditions of Y=0, M=0, C=0, there is a region which can not be substantially used in the largest number of color regions reproducible in a four color printer. That is, when the K-amount is maximum, although two colors can be used at the maximum in Y, M, C, three colors at maximum can not be used. Simply, when a printer, in which Y, M, K can be used, is supposed, and the color region is shown on a two-dimensional coordinate, the color region corresponds to an oblique line portion shown in FIG. 5 (P. Hung, "Colorimetric Calibration for Four-color Printers' Journal of the Society of Photographic Science and Technology of Japan 56(2), 112–122 (1993)).

Further, when a K-amount to reproduce a target color, that is, a ratio of a K-amount to the maximum K-amount obtained under the conditions of Y=0, M=0, C=0, is arbitrarily determined, there occurs the following case in which the K-amount is decreased and replaced with other three colors, in the case of a color located near the boundary of the reproducible color region. For example, in the case where the K-amount is 90 (the maximum amount is 100), M, C≧60 under the condition of Y=0, it is necessary that amounts of Y, M, C are increased by a decreased amount of K when the K-amount is decreased to 45. Accordingly, amounts of M and C are increased to the amounts larger than 100, and go out of the color region, so that the color can not be correctly reproduced.

On the other hand, as described above, in the third method, the minimum K-amount is used so as to increase the gradation properties. However, practically, there is a case in which it is preferable to increase the gradation properties with the chroma or tone, and a case in which it is preferable to decrease the gradation properties. In this connection, in the second and third methods, there is no degree of freedom in which the ratio of the K-amount is adjusted corresponding to the color so that the desired image quality can be obtained, because these two methods are restricted to the use of the maximum K-amount, or to the use of the minimum K-amount.

The present invention has been considered according to these conventional problems. The first object of the present invention is to provide a method in which a K-amount is appropriately set so that a pseudo profile can not be generated, when combinations of Y, M, C, K are determined in a four color printer in which Y, M, C, K are used. In addition to the above, the first object of the present invention is to provide a method in which the accuracy of an interpolation can be increased, and a color can be adjusted to include a preferable ratio of a K-amount corresponding to chroma or tone.

The second object of the present invention is to provide a method in which: the reproducible color region is kept constant by Y, M, C, K; the pseudo profile is not generated; and the accuracy of interpolation can be increased.

SUMMARY OF THE INVENTION

In order to accomplish the foregoing objects, a color separation image processing method and an apparatus for a four color printer according to the present invention comprises: a method for setting a K-amount corresponding to combinations of input signals to a target color so that the K-amount can be gradually changed when the target color is changed (a K-amount setting means in the apparatus); and a method for determining a combination of amounts of Y, M, C by which the target color is reproduced according to the K-amount which has been set in the foregoing (a color combination determination means in the apparatus).

Further, the K-amount may be set by the following methods: a combination of Y, M, C, K of the target color is obtained from the total of four kinds of combination conditions of Y, M, C, K, that is, three kinds of combination conditions of Y, M, C, K which are made when any one of amounts of Y, M, C is fixed at 0, and amounts of the other three colors are changed, and a combination condition of Y, M, C, K which is made when the K-amount is fixed at the maximum, and amounts of the other three colors are changed; a combination of Y, M, C, K for the same target color is obtained from the total of another four kinds of combination conditions of Y, M, C, K, that is, three kinds of combination conditions of Y, M, C, K which are made when any one of Y, M, C amounts is set at the maximum, and amounts of the other three colors are changed, and a combination condition of Y, M, C, K which is made when the K-amount is fixed at 0, and amounts of the other three colors are changed; and the K-amount may be set by two kinds of combinations of Y, M, C, K which have been obtained from the foregoing with respect to the same target color.

Further, the K-amount may be obtained by the following method: data of the K-amount corresponding to the combination of the input signals in which the K-amount is set to increase and decrease gradually with respect to anyone of lightness, chroma, and hue conditions of the target color, and data adjoining that of the K-amount are average-processed.

In this case, it is preferable to repeat the average-processing operation in order to renew data until a data value of averaged and renewed data almost converges.

Due to the foregoing, because the K-amount is set to gradually change when the target color is changed, the pseudo profile due to color doubling in the boundary of the color region of the printer is not generated, and the accuracy of the interpolation is increased. Further, because the K-amount is not specifically restricted as an absolute amount, the K-amount can be gradually changed, and the ratio of the K-amount can preferably be controlled according to the color.

Further, the K-amount is set by the first method as follows. The K-amount ($K_{max}$), in which the K-amount becomes maximum in the combinations with respect to the target color, is obtained from combinations of Y, M, C, K of the target color obtained from combinations of Y, M, C, K under the conditions of Y, M, C=0, K=max. The K-amount ($K_{min}$), in which the K-amount becomes minimum in the combinations with respect to the target color, is obtained from combinations of Y, M, C, K of the target color obtained from combinations of Y, M, C, K under the conditions of Y, M, C=max, K=0.

Accordingly, when the K-amount is set within the range from $K_{min}$ to $K_{max}$, the maximum color region is not limited, and the K-amount can be gradually changed when the target color is changed.

Further, input signal data, that is, the K-amount can be gradually changed, when the target color is changed, by the following method: data of the K-amount corresponding to the combination of the input signals in which the K-amount is set to increase and decrease in the same directions as those of an increase and decrease of predetermined color elements of the target color, and data adjoining that of the K-amount are average-processed.

In this case, when data adjoining in the directions of all color elements are average-processed, the K-amount can be gradually changed when the target color is changed in the directions of all color elements. When the foregoing average-processing operation is repeated until the value of data is approximately converged, the K-amount can be very smoothly changed when the color is changed.

Further, when the foregoing average-processing operation is conducted with respect to data of the K-amount which has been set so that the K-amount can be gradually changed in the direction of lightness, for example, by the foregoing first method, the processing speed can be increased.

DETAILED DESCRIPTION OF THE INVENTION

Figure 1:
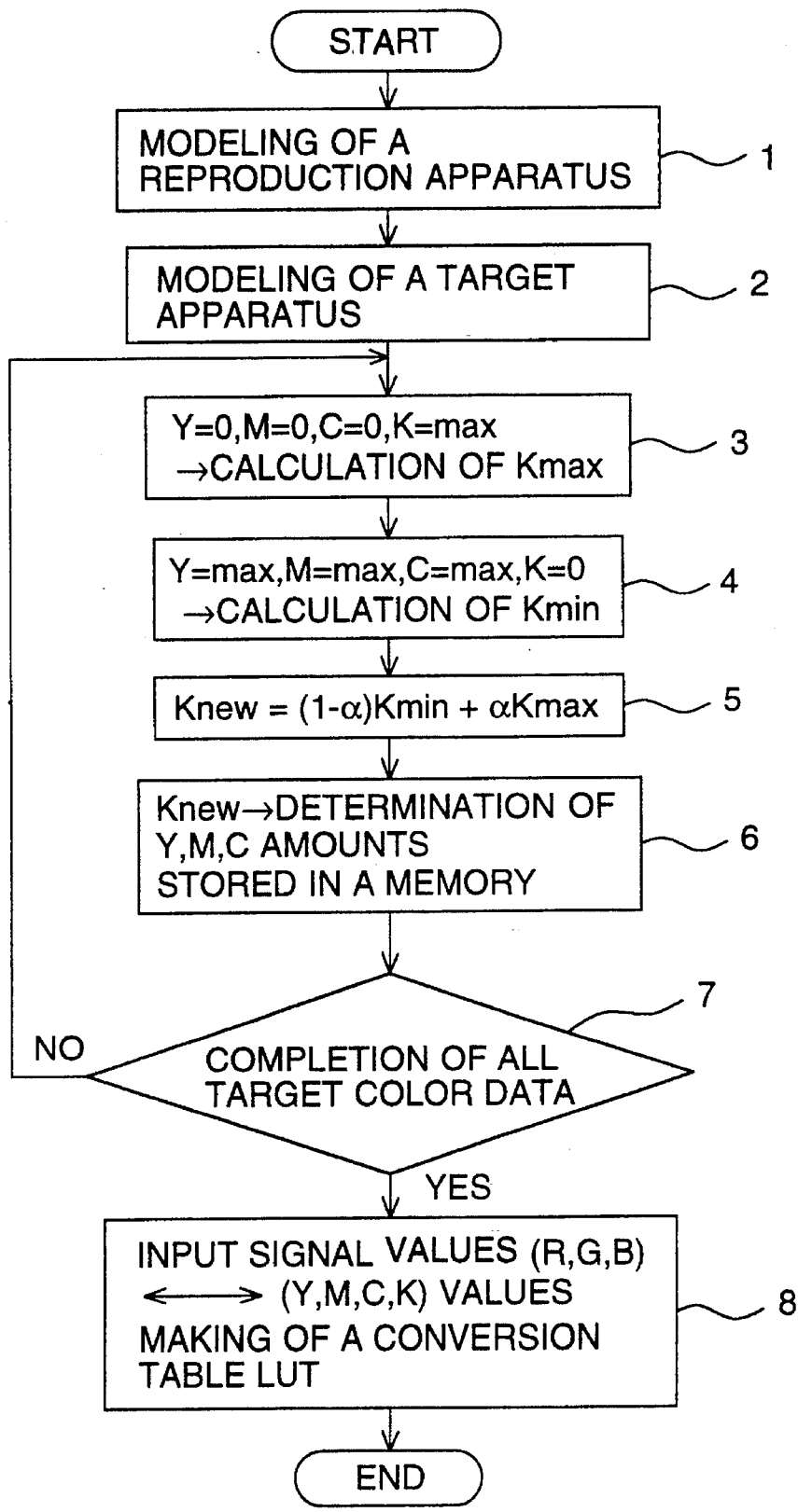
FIG. 1 is a flow chart showing a determination method of Y, M, C, K according to the first example of the present invention.

Referring to the drawings, examples of the present invention will be described as follows. FIG. 1 shows a flow of a processing method of the example.

① Initially, modeling of a four color printer which is a reproduction apparatus, that is, a functional equation, in which values of Y, M, C, K are converted into three stimulus values of X, Y, Z, is set by an arbitrary method. For example, as disclosed in Japanese Patent Publication Open to Public Inspection No. 86388/1990, the conversion equation may be obtained by the following method: a color patch, in which Y, M, C, K are quantized, is formed; the color patch is actually subjected to colorimetry; three stimulus values of X, Y, Z are obtained with respect to the value of the colorimetry; and then, the conversion equation from Y, M, C, K values into X, Y, Z values is obtained. Alternatively, the conversion equation may be obtained from modeling by multiple regression analysis, a Neugebauer equation, a Lambert-Beer low, or the like.

② In the same way, a relation between system values (color separation signal values, for example, R, G, B) of a target apparatus by which an image of a target color is displayed or an image signal of the target color is outputted by an arbitrary method, and tristimulus values of X, Y, Z are obtained and then the conversion equation is obtained. In this case, the target apparatus is a CRT, a specific printer, or a specific scanner, and the number of colors may be either three or four. For a method by which the conversion equation is obtained, modeling by 3×3 matrix in a TV can be used other than the methods described for the foregoing reproduction apparatus. Then, the tristimulus values corresponding to the system values obtained by the arbitrary combinations of the foregoing target apparatuses, are obtained using the foregoing modeling method. These tristimulus values may be further converted into orthogonal coordinates corresponding to a LCH of an appropriate photochromatic model (for example, a model of CIELAB, CIELUV, Hunt, Nayatani).

After the foregoing setting has been conducted, a combination of Y, M, C, K is determined by the method according to the present invention.

③ Initially, a combination of Y, M, C, K to reproduce the target color is calculated from a color solid which is made under the condition of Y=0, M=0, C=0, K=max. For this calculation, the method disclosed in [P. Hung, IS & T Final Program and Advance Printing of Paper Summaries, P. P. 419–422 (1992] can be used. The K-amount in this case is defined as $K_{max}$.

④ Next, the combination of Y, M, C, K to reproduce the target color is calculated from the color solid which is made under the condition of Y=max, M=max, C=max, K=0. The calculation method is the same as that under the foregoing conditions. The K-amount in this case is defined as $K_{min}$.

Here, in the case where the combination of the target color is found under these two conditions, the combination is located outside of the maximum color region in the reproduction apparatus when the combination is not found in color solids. Accordingly, the target color can not be accurately reproduced, and therefore, a color compression operation is conducted in order to obtain the finest reproducibility. Because, basically, differences of hue are most undesirable, the combination of Y, M, C, K in the projection point of the color solid is found when the color solid is projected from the point outside of the color region corresponding to the target color in the direction of changes of the chroma and lightness while the hue is being fixed.

⑤ When the K-amount exists between the foregoing $K_{max}$ and $K_{min}$, the combination of Y, M, C, and K does not deviate from the color region, and a new K-amount in this range is defined as the following using a K-amount factor $\alpha$.

$$K_{new} = (1-\alpha) \cdot K_{min} + \alpha \cdot K_{max}$$

Here, a parameter $\alpha$ is used. However, a constant number, a function corresponding to the equation L * (lightness) *, or C * (chroma), or a function using the system value of the target apparatus may be used for this definition. When a constant number is used, it is equivalent to a percentage of UCR or GCR which are conventionally used in a narrow sense. When a function is used, the function is equivalent to a conventional method of a variable UCR.

⑥ Next, according to the new K-amount thus determined, the combination of the other three colors of Y, M, C to reproduce the target color is calculated. In this calculation, when a four-dimensional LUT is used, the value of K is fixed, and a three-dimensional LUT is calculated from the four-dimensional LUT by interpolation, and then, a conventional method is used for the following process. It is guaranteed that a solution of the combination can be found, because the target color can be reproduced with respect to the given K-amount. When a three-dimensional LUT is used, the solution of the combination can be found using the calculating method disclosed in the foregoing [P. Hung, IS & T Final Program and Advance Printing of Paper Summaries, P. P 419–422(1992)]. The combination of Y, M, C, K thus calculated is stored in a memory.

⑦ The foregoing operations are repeated, and combinations of Y, M, C, K corresponding to all sampled target color data are found.

Figure 2:
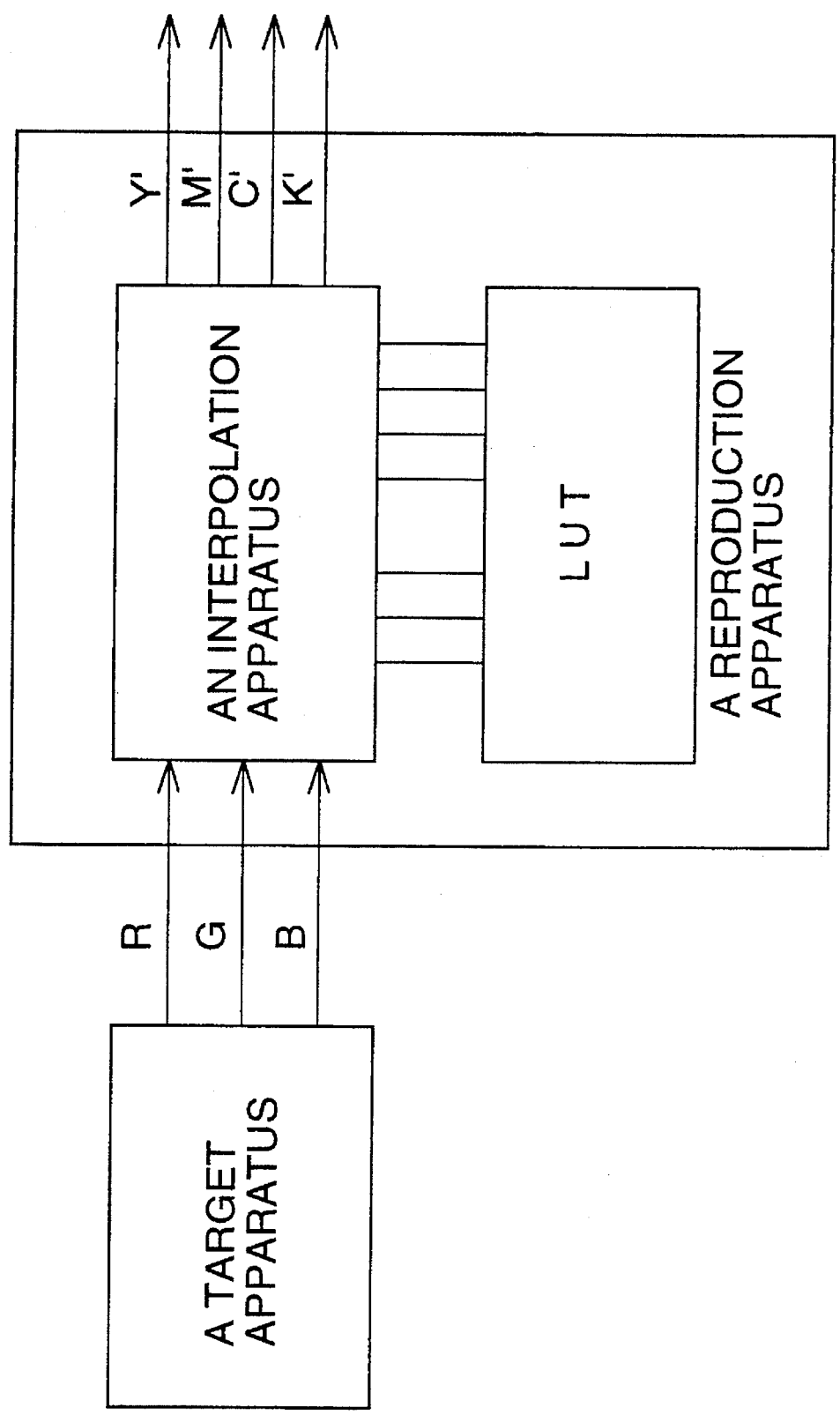
FIG. 2 is a block diagram showing the relation between a reproduction apparatus with an LUT made in the first example of the present invention, and a target apparatus.

⑧ The LUT of combinations of Y, M, C, K with respect to image signals (R, G, B) inputted from the target apparatus is made according to data thus obtained. Then, as shown in FIG. 2, when the LUT and the interpolation apparatus are combined with each other, combination data of Y, M, C, K near the target color is searched from the foregoing LUT according to the image signals inputted from the target apparatus and is interpolated by the interpolation apparatus, and Y, M, C, K (Y', M', C', K') corresponding to the target color are determined. The example of this method is disclosed in Japanese Patent Publication Open to Public Inspection No. 226867/1990, and may be used in this case.

When Y, M, C, K values corresponding to the system value of the target apparatus are found in the foregoing method, an arbitrary K-amount can be set under the condition that the K-amounts can be used in all color regions. Because the maximum and minimum K-amount ranges, within which the target color can be reproduced, are found in advance, an arbitrary K-amount can be determined within the range. As a result, full color regions of the printer can be used for Y, M, C, K.

Because this method is different from the method in which the K-amount is set at the maximum or minimum, and the K-amount can be slowly changed with respect to the change of color, this method can prevent a pseudo profile from being generated, and the accuracy of an interpolation in the vicinity of the boundary of colors can be kept good, so that the accuracy of the color reproduction can be increased.

Further, because an arbitrary K-amount can be set within the foregoing range, the degree of freedom of the K-amount is spread, that is, the K-amount can be set as follows: the ratio of the K-amount is increased in a gray portion or metallic color portion in which sharpness is required; or the ratio of the K-amount is reduced in a skin color portion in which the high gradation property is required, so that the desired image quality can be obtained.

Next, the second example will be described as follows.

$K_{max}$, and $K_{min}$ are found in the same way as ①, ② in the foregoing first example.

A new K-amount ($K_{new}$) is set within the range from $K_{max}$ to $K_{min}$ in the same way as ③ in the first example, and in this case, a parameter $\alpha$ is constant.

In this case, the K-amount is determined by $K_{max}$, and $K_{min}$. In the case where the K-amount is used for reproduction of the target color, the K-amount can be slowly changed when lightness-direction is changed. However, in the foregoing case, when chroma or hue is changed, the processing method is not considered for the change. For example, in the case where the color is changed when M is reduced from the color which is under the condition of Y>M>C, the $K_{max}$ is changed as follows: until M is equal to C, the value of the $K_{max}$ is not changed and equal to that of C which is minimum; when M is reduced to be lower than C, the $K_{max}$ follows M and is also reduced; and the $K_{max}$ starts to change into the broken-line-shape at a boundary point of M=C. Accordingly, the $K_{new}$ changes at a boundary of M=C. That is, a step increment due to the change of the K-amount is easily generated in the vicinity of a point at which the value of the second color is equal to that of the third color in Y, M, C, and a pseudo profile is easily generated, so that the accuracy of the interpolation is difficult to obtain.

As described above, when $\alpha$ is set as a function of $C^*$ (chroma) in the manner that $\alpha$ changes continuously with respect to a value of $C^*$, the K-amount can be set to slowly change when the chroma is changed. However, setting of the function is a little difficult. Further, when a hue $H^*$ is changed, $\alpha$ is not considered. Setting of a function is very difficult when both $C^*$ and $H^*$ are changed.

In this connection, a smoothing method is used in the example. In this method, data at a certain point is replaced with a value in which the foregoing data and data adjoining the foregoing data are averaged. As the simplest method, data is smoothing-processed using a table of the $K_{new}$ corresponding to each sampled value of input values (for example, R, G, B).

Prior to the smoothing processing, a boundary condition is set so that the maximum color region, which can be limited by four colors of Y, M, C, K, can be used even when the smoothing processing is conducted. The boundary condition by which the maximum color region can be used, is a combination of Y, M, C, K by which the following conditions are satisfied.

Figure 3:
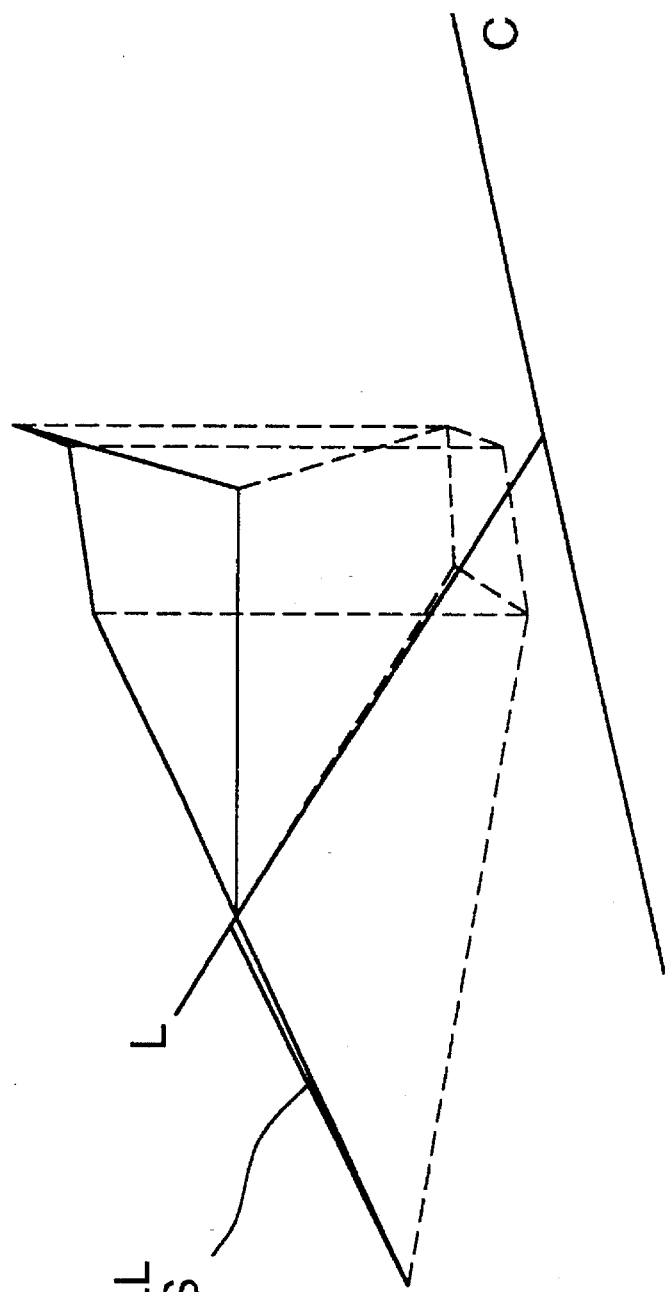
FIG. 3 is a diagram showing the conditions under which a K-amount can use the maximum color region in the second example.

$a_k=0$ and $a_y=0$
$a_K=0$ and $a_m=0$
$a_k=0$ and $a_c=0$
$a_y=0$ and $a_m=$max
$a_y=0$ and $a_c=$max
$a_m=0$ and $a_y=$max
$a_m=0$ and $a_c=$max
$a_c=0$ and $a_y=$max
$a_c=0$ and $a_m=$max
$a_k=$max and $a_y=$max
$a_k=$max and $a_m=$max
$a_k=$max and $a_c=$max Where, $a_i$ means an amount of a color of a subscript i. FIG. 3 shows the color amount when a hypothetical printer, in which Y, M, K are used, is expressed as an example.

Next, a concrete smoothing processing method will be described as follows. As the simplest method, a table of the foregoing K-amount made of input signal values (R, G, B) is used, and the table is smoothing-processed by the following equation. That is, when i, j, k show positions of combinations of input values adjoining the K-amount which should be smoothing-processed, 27 data ($3^3=27$) are smoothing-processed using the following equation.

$$K_{new}(r_0, g_0, b_0) = \frac{1}{27} \sum_{i=-1}^{1} \sum_{j=-1}^{1} \sum_{k=-1}^{1} K(r_i, g_j, b_k) \quad (1) \qquad \text{[Equation 1]}$$

In this case, smooth K depending on input signal space is made. Accordingly, K is smooth in space which is obtained by input signals. However, K is not necessarily smooth in other space, for example, in uniform color space. For example, when the density of a chromaticity point corresponding to input space signals is thick, the portion is sharp in the uniform color space according to the calculation by the foregoing equation. Inversely, when the density of the chromaticity point is thin, K is smooth. Accordingly, it is necessary to consider that in which space K is smooth. Naturally, in the smoothness, it is desired that the color is smooth in visual uniform color space. For the foregoing calculation, for example, the reproduction color corresponding to each input can be expressed by the following equation.

$$L^*(r_i, g_j, b_k), u^*(r_i, g_j, b_k), v^*(r_i, g_j, b_k) \qquad \text{[Equation 2]}$$

$$D = \begin{bmatrix} L^*(r_{-1}, g_{-1}, b_{-1}) & u^*(r_{-1}, g_{-1}, b_{-1}) & v^*(r_{-1}, g_{-1}, b_{-1}) & 1 \\ | & | & | & | \\ L^*(r_i, g_j, b_k) & u^*(r_i, g_j, b_k) & v^*(r_i, g_j, b_k) & 1 \\ | & | & | & | \\ L^*(r_1, g_1, b_1) & u^*(r_1, g_1, b_1) & v^*(r_1, g_1, b_1) & 1 \end{bmatrix}$$

$$K = \begin{bmatrix} K(r_{-1}, g_{-1}, b_{-1}) \\ | \\ K(r_i, g_j, b_k) \\ | \\ K(r_1, g_1, b_1) \end{bmatrix}$$

$K_{new}(r_0, g_0, b_0) =$ $[L^*(r_0, g_0, b_0) \; u^*(r_0, g_0, b_0) \; v^*(r_0, g_0, b_0) \; 1] (D^T \cdot D)^{-1} D^T K$ Where, i, j, k correspond to any of $-1, 0, 1$, and $i=j=k=0$ show a color to be observed.

This calculation is conducted by combinations of inputted target colors with respect to all portions except the boundary. For example, when input signals are combination of 0 to N, the calculation is conducted with respect to $1-(N-1)$. Due to the foregoing, the boundary conditions to secure all color regions are retained, and the combination of Y, M, C, K, in which K is gradually changed, can be obtained. Here, although a case of $L^* u^* v^*$ is shown as uniform color space, CIELAB space, or space according to Y, M, C of an output system may of course be used.

Further, the smoothing operation can be repeatedly conducted for ultimate smoothing. When the smoothing operation is repeatedly conducted, K can be most smoothly changed. Actually, because the smoothing operation is conducted in three dimensional space, it is difficult to show the change of K. Accordingly, a hypothetical three color printer, in which Y, M, K are used, is assumed, and combinations of Y, M are reproduced from combinations of Y, M, K. At this time, K is defined by the following equation.

$a_k$ new=min ($a_y$ old, $a_m$ old)

Figure 4:
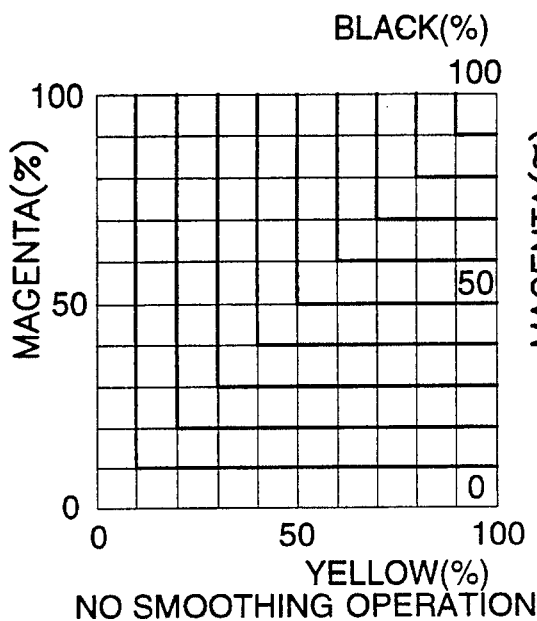
FIGS. 4(a)–4(d) are diagrams showing the conditions of change of the K-amount when smoothing processing is conducted in the second example.
Figure 4:
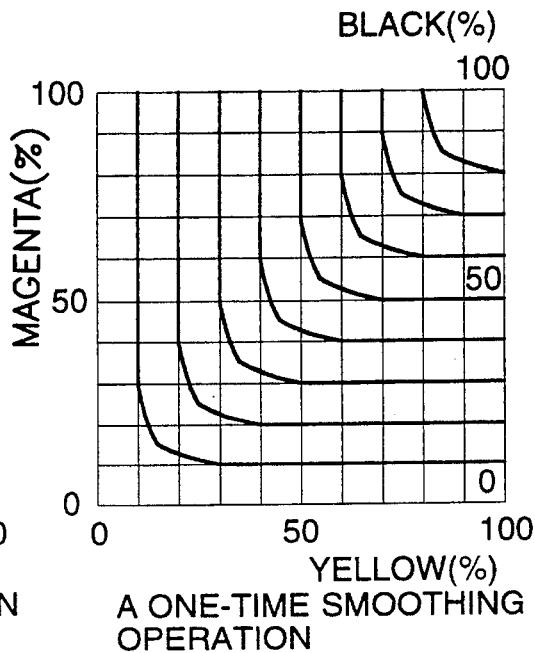
Figure 4:
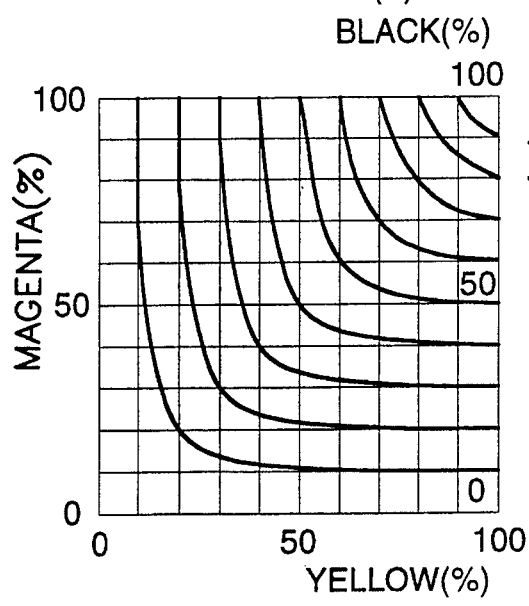
Figure 4:
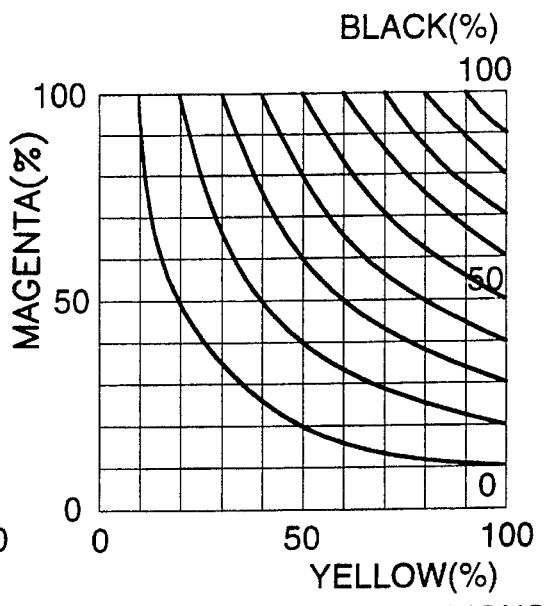
Figure 5:
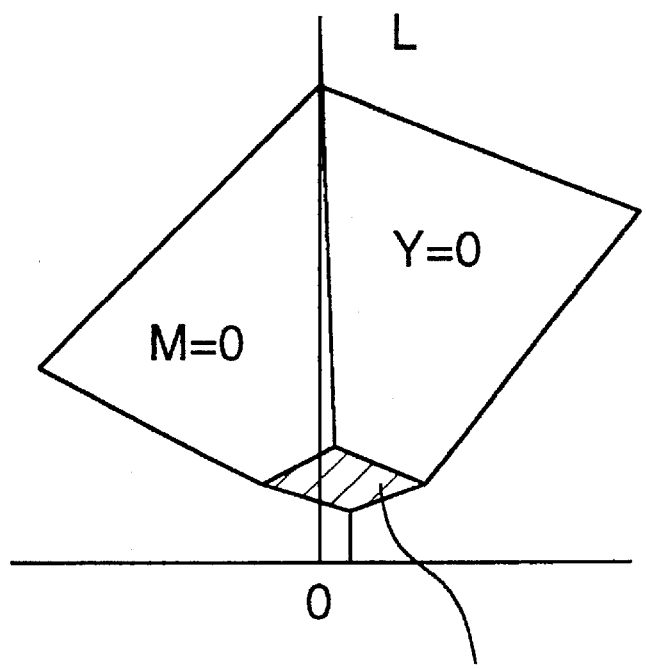
FIG. 5 is a view showing a color region which can not be used by the conventional methods.

Where, $a_k$ new, $a_y$ old, $a_m$ old denote amounts of colors corresponding to the subscripts respectively. In FIG. 4, the values of $K_{new}$ corresponding to Y and M are expressed in the form of contour lines. In FIG. 4, (a) expresses K which is simply defined by the above equation. As clearly seen from the drawing, K is sharply changed at a portion of Y=M, and K is not gradually changed at that portion. When the equation 1 is applied once to (a), K can be gradually changed as shown in FIG. 4(b). When this smoothing operation is repeated five times, K is changed as shown in FIG. 4(c). Further, when this operation is repeated 100 times, K-curves shown in FIG. 4(c) almost converge, and K-curves shown in FIG. 4(d) can be obtained. This condition, shown in FIG. 4(d) is considered to be the most smooth change of K. Y and M can be gradually changed because Y and M are determined depending on K, When $K_{new}$ is determined as described above, values of the other three colors of Y, M, C are calculated in the same way as those shown in ⑥, ⑦, ⑧ of the example. Then, the interpolation is conducted by the interpolation apparatus, and the combination of Y, M, C, K corresponding to a system value of the target apparatus is found.

Although a case, in which the maximum color region of the four color printer can be used, is shown in this example, the smoothing method described above, can be, of course, applied to the following cases: for example, a case in which K is used within the color region which can be reproduced using only Y, M, C; a case in which the K-amount is determined under condition of Y, M, C=0 as described in the first conventional example; and a case in which the maximum color region can not be used.

Further, because this example is structured in the manner that data of the K-amount, which are set so that K is gradually changed in the direction of lightness, are smoothing-processed, the smoothing processing, by which K is gradually changed when other chroma and hue are changed, can be conducted in a short period of time. However, for example, the smoothing processing may be conducted with respect to data of $K_{max}$, and $K_{min}$, and the smoothing processing may be simultaneously conducted with respect to K corresponding to lightness, chroma, and hue.

As described above, according to the present invention, because the K-amount can be gradually changed when the target color is changed, generation of a pseudo profile can be prevented, and the interpolation accuracy can be increased. Further, while keeping the smoothness of K excellent, a ratio of the K-amount can be appropriately adjusted corresponding to the color.

Further, in order to reproduce the target color, the maximum K-amount ($K_{max}$) when the K-amount used is maximum, and the minimum K-amount ($K_{min}$) when the K-amount used is minimum, are found, and the K-amount is set within the range from $K_{min}$ to $K_{max}$. Due to the foregoing, the maximum color region can be used, and the K-amount can be gradually changed when the target color is changed.

Further, the K-amount can be set so that the K-amount can be gradually changed when the target color is changed, even when adjoining data are average-processed. When the average processing operation is repeated a large number of times so that the value of data converges, the K-amount can be very gradually changed when the color is changed.

What is claimed is:

1. A color separation processing method for reproducing a color image with four color components of yellow, magenta, cyan, and black, comprising the steps of:

receiving target color signals representing a portion of said color image, said target color signals being identified as a place in a color solid corresponding at least to tristimulus values;

determining an amount of a black color component of said portion of said color image so that said black color component of said portion is gradually changed from other neighbor portions of said color image; and determining amounts of yellow, magenta, and cyan components of said portion of said color image according to said amount of said black color component such that said amounts of yellow, magenta, and cyan components correspond to said target color signals identified in said color solid.

2. A color separation processing method for reproducing a color image with four color components of yellow, magenta, cyan, and black, comprising the steps of:

receiving target color signals representing a portion of said color image;

determining an amount of a black color component of said portion of said color image so that said black color component of said portion is gradually changed from other neighbor portions of said color image, the step of determining said amount of said black color component including the steps of:

determining a first combination of amounts of said four color components representing said portion of said color image so that either an amount of one of yellow, magenta, and cyan color components is 0 or an amount of said black color component is maximum;

determining a second combination of amounts of said four color components representing said portion of said color image so that either an amount of one of yellow, magenta, and cyan color components is maximum of an amount of said black color component is 0; and determining said amount of said black color component according to said first combination and said second combination; and determining amounts of yellow, magenta, and cyan components of said portion of said color image according to said amount of said black color component.

3. A color separation processing method for reproducing a color image with four color components of yellow, magenta, cyan, and black, comprising the steps of:

receiving target color signals representing a portion of said color image;

determining an amount of a black color component of said portion of said color image so that said black color component of said portion is gradually changed from other neighbor portions of said color image, the step of determining said amount of said black color component including the steps of:

determining said amount of said black color component so that a color of said portion of said color image is gradually changed from colors of other neighbor portions of said color image; and averaging said amount of said black color component with amounts of black color component representing other neighbor portions of said color image; and determining amounts of yellow, magenta, and cyan components of said portion of said color image according to said amount of said black color component.

4. The method of claim 3, wherein the step of determining said amount of said black color component includes:

determining said amount of said black color component so that a color of said portion of said color image, with respect to at least one of lightness, chroma, and hue, is gradually changed from colors of other neighbor portions of said color image.

5. The method of claim 3, wherein the step of averaging said amount of said black color component includes:

repeating said averaging step until change of said amount of said black color component converge.

6. A color separation processing apparatus for reproducing a color image with four color components of yellow, magenta, cyan, and black, comprising:

receiving means for receiving target color signals representing a portion of said color image, said target color signals being identified as a place in a color solid corresponding at least to tristimulus values;

first determining means for determining an amount of a black color component of said portion of said color image so that said black color component of said portion is gradually changed from other neighbor portions of said color image; and second determining means for determining amounts of yellow, magenta, and cyan components of said portion of said color image according to said amount of said black color component such that said amounts of yellow, magenta, and cyan components correspond to said target color signals identified in said color solid.

7. A color separation processing apparatus for reproducing a color image with four color components of yellow, magenta, cyan, and black, comprising:

receiving means for receiving target color signals representing a portion of said color image;

first determining means for determining an amount of a black color component of said portion of said color image so that said black color component of said portion is gradually changed from other neighbor portions of said color image, said first determining means determining:

a first combination of amounts of said four color components representing said portion of said color image so that either an amount of one of yellow, magenta, and cyan color components is 0 or an amount of said black color component is maximum;

a second combination of amounts of said four color components representing said portion of said color image so that either an amount of one of yellow, magenta, and cyan color components is maximum or an amount of said black color component is 0; and said amount of said black color component according to said first combination and said second combination; and second determining means for determining amounts of yellow, magenta, and cyan components of said portion of said color image according to said amount of said black color component.

8. A color separation processing apparatus for reproducing a color image with four color components of yellow, magenta, cyan, and black, comprising:

receiving means for receiving target color signals representing a portion of said color image;

first determining means for determining an amount of a black color component of said portion of said color image so that said black color component of said portion is gradually changed from other neighbor portions of said color image, said first determining means determining said amount of said black color component so that a color of said portion of said color image, with respect to at least one of lightness, chroma, and hue, is gradually changed from colors of other neighbor portions of said color image; and average means for averaging said amount of said black color component with amounts of black color component representing other neighbor portions of said color image; and second determining means for determining amounts of yellow, magenta, and cyan components of said portion of said color image according to said amount of said black color component.

9. The apparatus of claim 8, wherein said averaging means repeats averaging said amount of said black color component until change of said amount of said black color component converge.

* * * * *